United States Patent [19]

Disalvo

[11] Patent Number: 5,923,739
[45] Date of Patent: Jul. 13, 1999

[54] VCR WITH REMOTE TELEPHONE PROGRAMMING

[76] Inventor: Anthony G Disalvo, 18259 Bellorita St., Rowland Hts, Calif. 91748

[21] Appl. No.: 08/816,514

[22] Filed: Mar. 13, 1997

[51] Int. Cl.⁶ .................................................. H04M 11/00
[52] U.S. Cl. ............................... 379/102.03; 379/102.01; 379/102.02
[58] Field of Search ............................ 379/93.05, 102.01, 379/102.03, 102.07

[56] References Cited

U.S. PATENT DOCUMENTS

| | | | |
|---|---|---|---|
| 4,841,562 | 6/1989 | Lem | 379/102.03 |
| 4,885,766 | 12/1989 | Yasuoka et al. | 379/105 |
| 4,899,370 | 2/1990 | Kameo et al. | 379/102.03 |
| 5,216,228 | 6/1993 | Hashimoto | 379/102.03 |

*Primary Examiner*—Vivian Chang
*Assistant Examiner*—Melur Ramakrishnaiah

[57] ABSTRACT

A new VCR with Remote Telephone Programing for allowing a user to program a conventional VCR from a remote location through a phone line. The inventive device includes a conventional VCR and a circuitry well known in the art electrically connected mesial the conventional VCR and the phone line for allowing the user to program the conventional VCR with a telephone button pad.

1 Claim, 4 Drawing Sheets

VCR WITH REMOTE TELEPHONE PROGRAMMING

BACKGROUND OF THE INVENTION

1. Field of the Invention

The present invention relates to VCR Devices and more particularly pertains to a new VCR with Remote Telephone Programing for allowing a user to program a conventional VCR from a remote location through a phone line.

2. Description of the Prior Art

The use of VCR Devices is known in the prior art. More specifically, VCR Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art VCR Devices include U.S. Pat. Nos. 5,420,913; 5,138,464; 4,625,080; 4,540,851; 4,841,562; and 4,829,555.

While these devices fulfill their respective, particular objectives and requirements, the aforementioned patents do not disclose a new VCR with Remote Telephone Programing. The inventive device includes a conventional VCR and a circuitry well known in the art electrically connected mesial the conventional VCR and the phone line for allowing the user to program the conventional VCR with a telephone button pad.

In these respects, the VCR with Remote Telephone Programing according to the present invention substantially departs from the conventional concepts and designs of the prior art, and in so doing provides an apparatus primarily developed for the purpose of allowing a user to program a conventional VCR from a remote location through a phone line.

SUMMARY OF THE INVENTION

In view of the foregoing disadvantages inherent in the known types of VCR Devices now present in the prior art, the present invention provides a new VCR with Remote Telephone Programing construction wherein the same can be utilized for allowing a user to program a conventional VCR from a remote location through a phone line.

The general purpose of the present invention, which will be described subsequently in greater detail, is to provide a new VCR with Remote Telephone Programing apparatus and method which has many of the advantages of the VCR Devices mentioned heretofore and many novel features that result in a new VCR with Remote Telephone Programing which is not anticipated, rendered obvious, suggested, or even implied by any of the prior art VCR Devices, either alone or in any combination thereof.

To attain this, the present invention generally comprises a conventional VCR and a circuitry well known in the art electrically connected mesial the conventional VCR and the phone line for allowing the user to program the conventional VCR with a telephone button pad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new VCR with Remote Telephone Programing apparatus and method which has many of the advantages of the VCR Devices mentioned heretofore and many novel features that result in a new VCR with Remote Telephone Programing which is not anticipated, rendered obvious, suggested, or even implied by any of the prior art VCR Devices, either alone or in any combination thereof.

It is another object of the present invention to provide a new VCR with Remote Telephone Programing which may be easily and efficiently manufactured and marketed.

It is a further object of the present invention to provide a new VCR with Remote Telephone Programing which is of a durable and reliable construction.

An even further object of the present invention is to provide a new VCR with Remote Telephone Programing which is susceptible of a low cost of manufacture with regard to both materials and labor, and which accordingly is then susceptible of low prices of sale to the consuming public, thereby making such VCR with Remote Telephone Programing economically available to the buying public.

Still yet another object of the present invention is to provide a new VCR with Remote Telephone Programing which provides in the apparatuses and methods of the prior art some of the advantages thereof, while simultaneously overcoming some of the disadvantages normally associated therewith.

Still another object of the present invention is to provide a new VCR with Remote Telephone Programing for allowing a user to program a conventional VCR from a remote location through a phone line.

Yet another object of the present invention is to provide a new VCR with Remote Telephone Programming which includes a conventional VCR and a circuitry well known in the art electrically connected mesial the conventional VCR and the phone line for allowing the user to program the conventional VCR with a telephone button pad.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
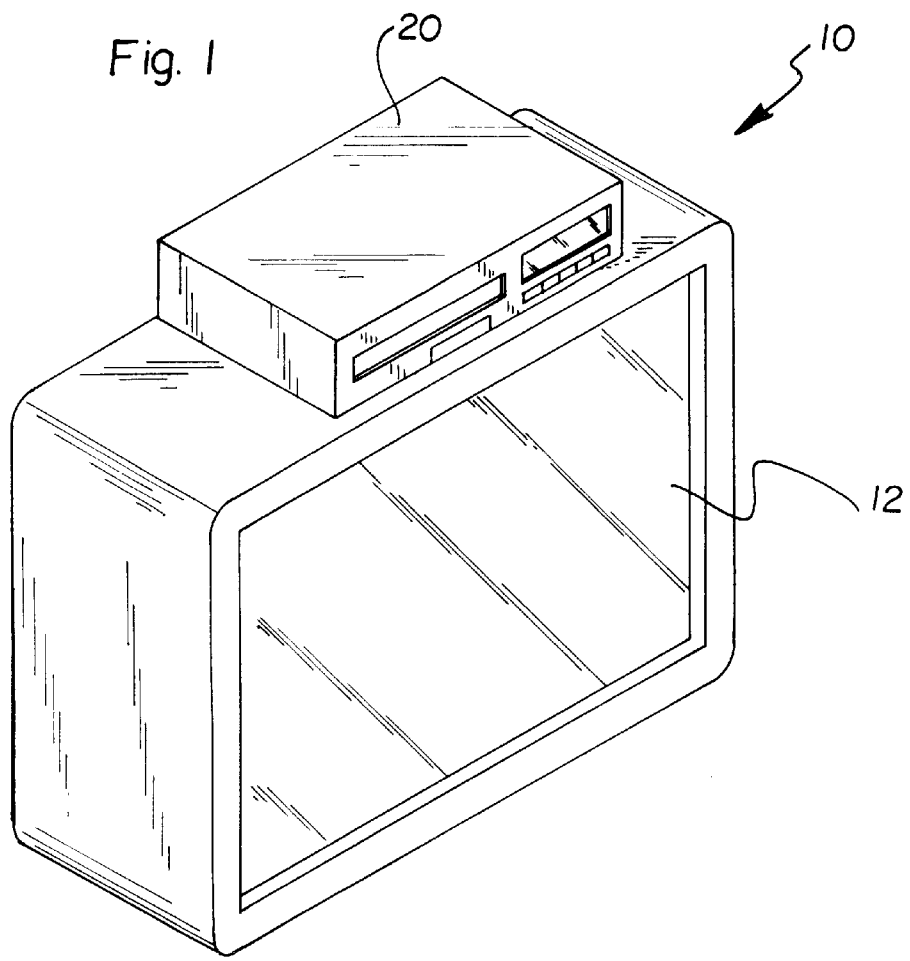
FIG. 1 is an upper perspective view of a new VCR with Remote Telephone Programing according to the present invention.
Figure 2:
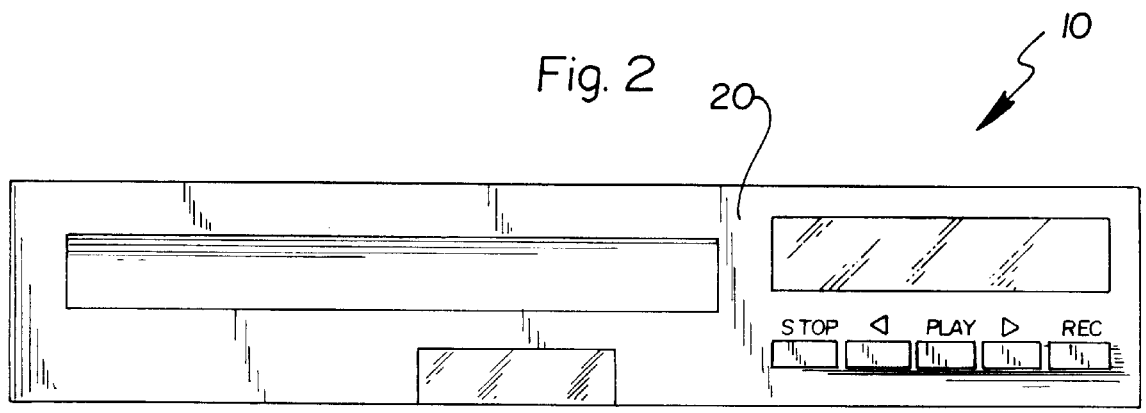
FIG. 2 is a front view of the present invention.
Figure 3:
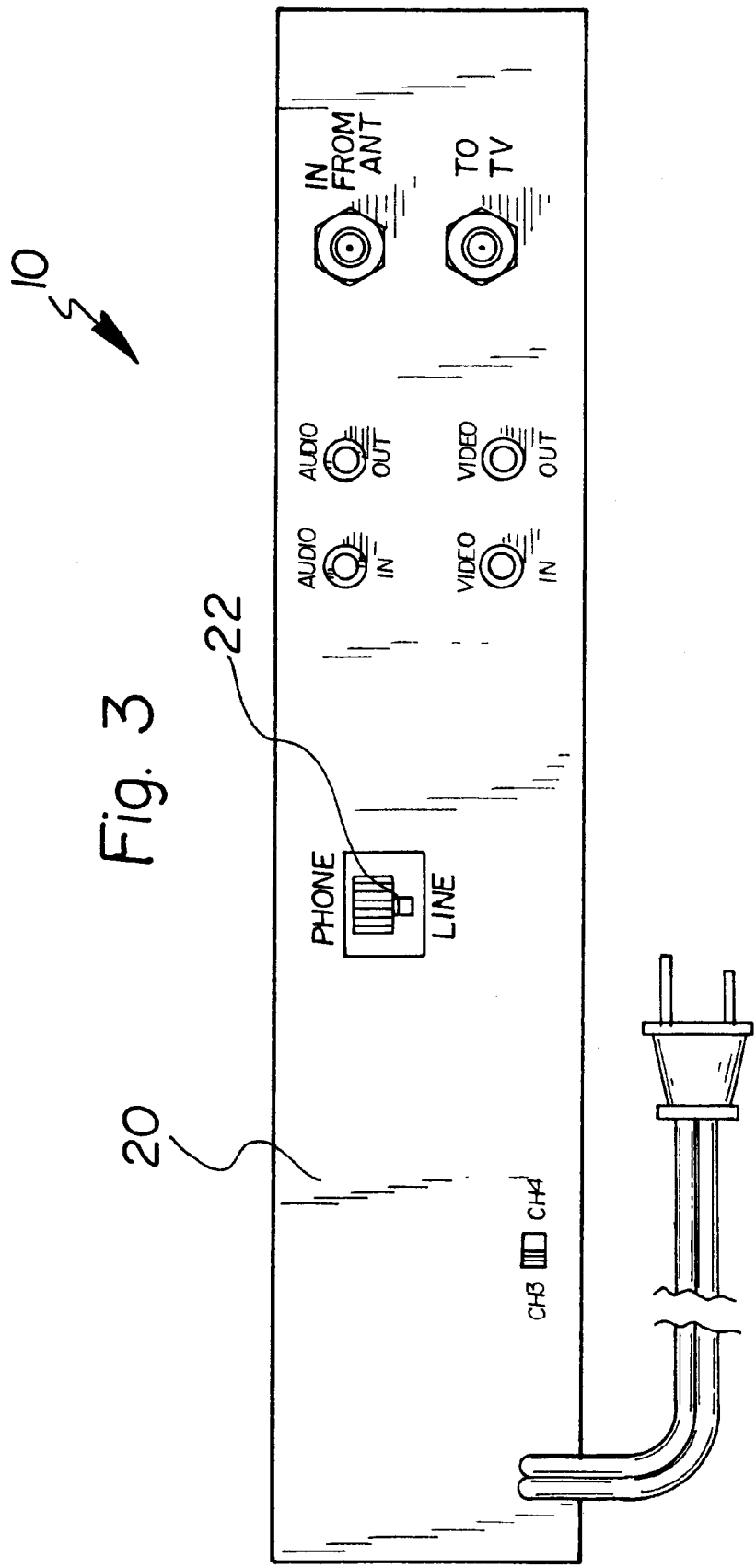
FIG. 3 is a rear view of the present invention.
Figure 4:
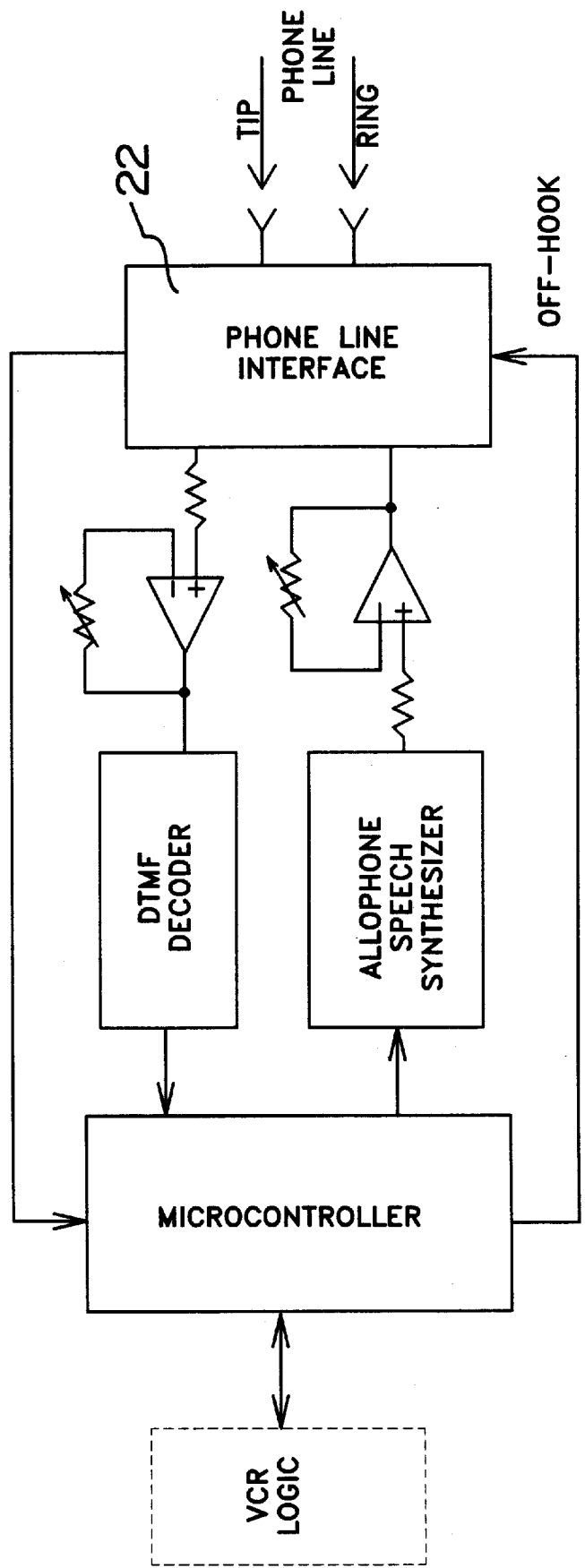
FIG. 4 is a schematic illustration of conventional circuitry utilized within the present invention.
Figure 5:
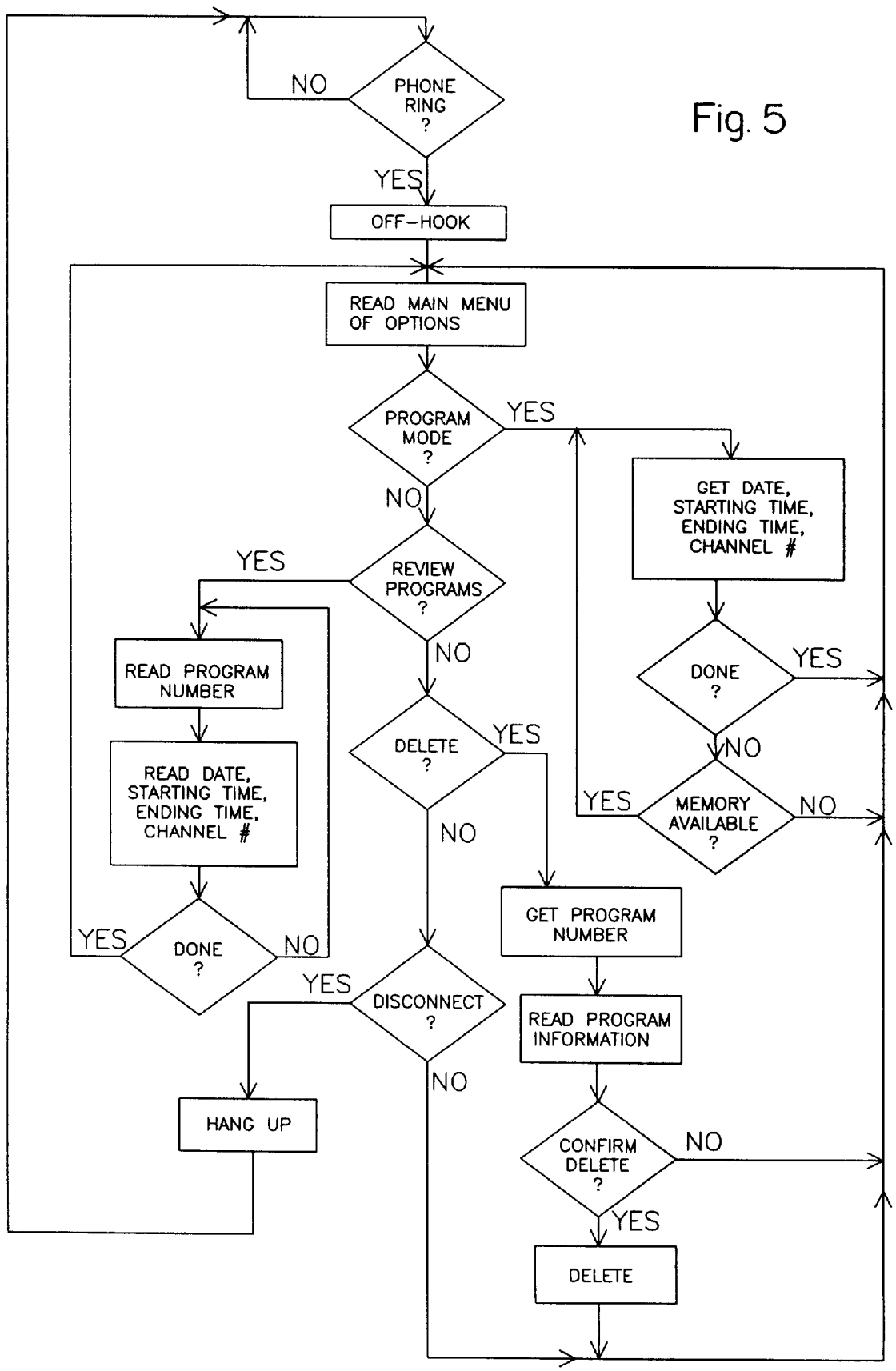
FIG. 5 is a block diagram of the present invention.

With reference now to the drawings, and in particular to FIGS. 1 through 5 thereof, a new VCR with Remote Telephone Programing embodying the principles and concepts of the present invention and generally designated by the reference numeral 10 will be described.

As best illustrated in FIGS. 1 through 6, the VCR with Remote Telephone Programing 10 comprises a means for establishing a telecommunication path between a remote terminal and a conventional VCR 20 over the telephone, a means responsive to a plurality of remote control signals sent by the remote terminal to program the conventional VCR 20, and a means responsive to the plurality of remote control signals for programming the conventional VCR 20. The remote control signals is dialing tones from a conventional telephone. The remote terminal preferably is constructed from DTMF telephone set. A voice synthesizer unit is electrically connected within the conventional VCR 20 for sending voice instructions to the remote telephone set. The telephone line is electrically connected to the means for establishing a telecommunication path by a phone line interface 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of programming a VCR from a remote location using a telephone, the steps of the method comprising:

providing a VCR having a means for answering an incoming phone call and converting touch tone phone signals into programming signals for the VCR;

connecting the VCR to a phone line and an incoming signal source for television programs;

performing of the following steps by said VCR:
monitoring said phone line for an incoming call;
responding to an incoming call on said phone line by making a communicative connection to the remote location through said phone line;
playing a main menu message requesting if a program mode, review mode of a delete mode is desired;
entering said program mode when said program mode is selected by a user, wherein said program mode includes the steps of
playing an audio message requesting program information including date of program to be recorded, starting time, ending time, and channel number,
receiving DTMF signals entered by the user corresponding to the program information and associating the program information with a program number,
playing an audio message asking if the programming is completed, and
returning to said step of playing said main menu message upon receiving a signal from the user that programming is completed,
monitoring for available memory upon receiving a signal that programming is not completed,
returning to the step of playing the main menu message when insufficient memory is available, and
returning to the step of playing an audio message requesting program information when memory is available;
entering said review mode when said review mode is selected by the user, wherein said review mode includes the steps of
playing an audio message stating program number,
playing an audio message stating program information associated with the program number,
repeating the steps of playing the audio message stating a program number and playing the audio message stating program information associated with the program number, and
returning to said step of playing said main menu message;
entering said delete mode when said delete mode is selected by a user, wherein said delete mode includes the steps of
playing an audio message requesting the user to enter a program number associated with the program information to be deleted,
playing an audio message stating the program information of the associated program number entered by the user, playing an audio message requesting the user to confirm deletion of the selected program information, returning to the step of playing the main menu message when the user does not confirm deletion of the selected program information, deleting the program information when the user enters a confirming signal, and returning to the step of playing the main menu message;

monitoring whether the communicative connection has been broken by the user;

returning to the step of playing the main menu message when the communicative connection still exists; and returning to the step of monitoring for an incoming phone call when the communicative connection has been broken.

\* \* \* \* \*